Sept. 25, 1928.

A. PFAU 1,685,749

CONTROL SYSTEM

Filed Dec. 8, 1924

Inventor
A. Pfau
by
Attorney

Patented Sept. 25, 1928.

1,685,749

UNITED STATES PATENT OFFICE.

ARNOLD PFAU, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

CONTROL SYSTEM.

Application filed December 8, 1924. Serial No. 754,538.

This invention relates in general to control systems for producing desired characteristics of motion of some element which it is desired to move. More particularly, it relates to control systems including a motive device whereby desired characteristics of motion of the motive device may be obtained, and, more specifically, to servo-motors. The invention may be applied in prime mover control systems, and more particularly in the control of the admission of operating fluid to prime movers.

The invention will be described more particularly in connection with its application to hydraulic motors but it is to be understood that it may be applied to other forms of prime movers, and to other uses.

The flow of fluid in a conduit supplying a prime mover is usually controlled, primarily, by some form of mechanical means. In the case of a hydraulic turbine this means may be a butterfly valve, the gates or guide vanes of the turbine, or, in the case of an impulse wheel, the needle of a nozzle. The pressure variations in the conduit are a function of the change of flow through the conduit, both as to the amount of flow change and as to the rate of change of flow. The rate of motion of the means for controlling the admission of fluid is therefore a factor in determining the pressure variations in the conduit.

It has been found in practice that when the flow in a conduit is reduced from its maximum value, for example, to zero, that the pressure rise in the conduit is less than when the flow is reduced to zero from a value less than the maximum in a correspondingly reduced period of time. In order to prevent excessive pressure in the latter instance the time may of course be lengthened but if the admission controlling means is controlled by an automatic speed governor, for example, then the time for closing the admission controlling means from its fully open to fully closed position will usually be too long, resulting in too high a speed rise of the turbine before the fluid is cut off.

One of the objects of the invention is to provide means for obviating the before mentioned difficulties.

Another object is to provide means whereby the pressure variations in the conduit may be kept within desired limits under all ordinary conditions of operation of the admission controlling means.

A more specific object is the provision of means whereby the rate of motion of the admission controlling means may be predetermined by the position of such controlling means. A still more specific object is a provision of means whereby the rate of motion of the admission controlling means toward open position and the rate of motion toward closed position may be predetermined by the position of said controlling means, and if desired these rates of motion may be made different.

Still another object is the provision of means whereby the speed control characteristics of a governor-controlled prime mover may be predetermined, and more specifically whereby the rapidity of response of the admission controlling means to the governor proper may be predetermined for any position of said controlling means.

A further object is the provision of means whereby the prime mover may be given predetermined starting, stopping or running characteristics, or two or more of such predetermined characteristics, to thereby adapt it for better and more efficient use in systems in which the prime mover is started and stopped semi-automatically or entirely automatically. Other objects will appear hereinafter as the description of the invention proceeds.

The novel features of the invention will appear from this specification and the accompanying drawing forming a part thereof and showing one embodiment of said invention, and all these novel features are intended to be pointed out in the claims.

Figure 1:
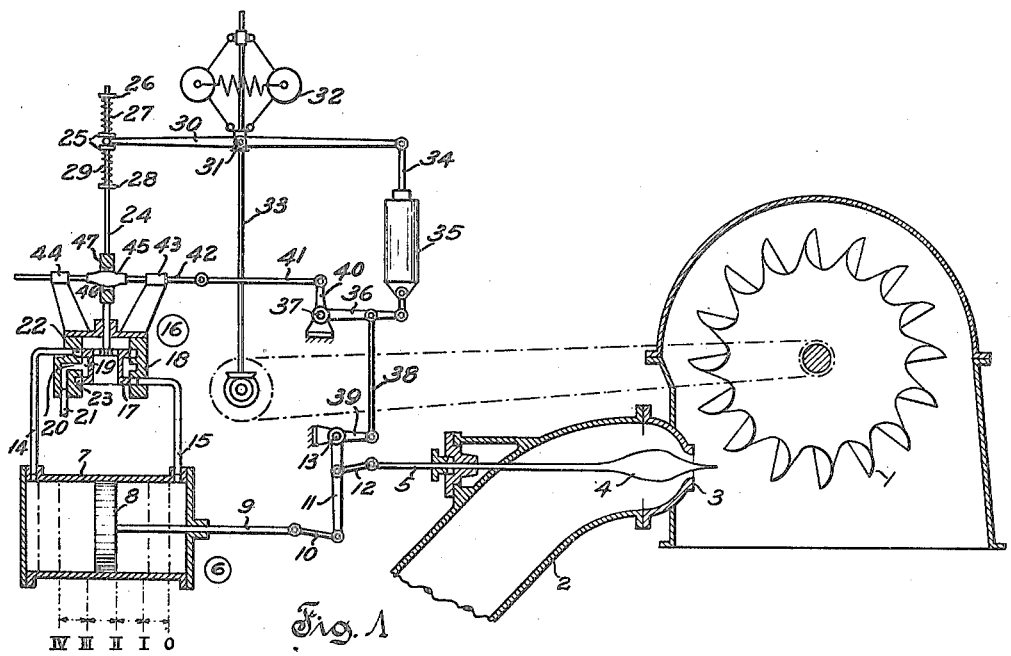
Fig. 1 is a diagrammatic showing of the manner in which the invention may be applied in connection with a hydraulic impluse wheel and governor therefor.

Referring to Fig. 1, an impulse wheel 1 is more or less diagrammatically shown. Water may be supplied to the wheel 1 through a conduit 2 leading to a nozzle 3. The flow of water from the nozzle 3 is here shown as controlled by means of a needle 4 which may be reciprocated by means of a rod 5. The rod 5 may be operated by means of a servo-motor 6 here shown as including a cylinder 7 in which a piston 8 may operate. The piston is provided with a piston rod 9 to which may be pivotally connected a link 10 in turn pivotally connected to a lever 11. The lever 11 may be fastened to a shaft 13 swingable in stationary pivots. A connection between the lever 11 and the rod 5 may be made by means of a link 12 pivotally connected to these elements respectively. It is of course to be understood that the connection between the servo-motor 6 and the needle 4 is merely illustrative and that any other suitable form of connection may be utilized. Furthermore, as has been previously noted, the prime mover may be of any other form and the flow of operating fluid thereto may be controlled in any other desired manner. Fluid under pressure may be admitted to either end of cylinder 7 by means of pipes 14, 15 respectively. The admission of fluid under pressure to these pipes may be controlled by means of a regulating or distributing valve 16. The valve here shown includes a valve piston 17 adapted to operate in a valve cylinder 18. The valve piston 17 is provided with an annular channel 19 adapted to communicate, in the position of the valve shown in Fig. 1, with an annular inlet port 20. Fluid under pressure may be led to the inlet port 20 through a pipe 21 which may be connected to any suitable source of fluid under pressure (not shown). The valve cylinder 18 is provided with two annular ports 22, 23 which, in the position of the valve piston 17 as shown in Fig. 1, are closed by the valve piston. It is therefore clear that when the position of the parts is as shown no fluid will be admitted from port 20 to port 22 and to the pipe 14 with which it communicates, nor to port 23 and to the pipe 15 with which it communicates.

The valve piston 17 is provided with a stem 24 for operating the same. Slidably disposed around the valve stem 24 is a flanged sleeve 25. Above the sleeve 25 the stem 24 has a collar 26 fastened thereto and between this collar and the sleeve 25 is disposed a spring 27. Below the sleeve 25 the stem 24 has fastened thereto a collar 28 between which and the sleeve 25 is disposed a spring 29. A floating lever 30 having a floating pivot 31 associated with the slidable collar of the fly ball mechanism 32, has its left hand end, as viewed in Fig. 1, associated with the sleeve 25 and its right hand end has pivoted thereto a piston rod 34 of a compensating or dash pot device 35 which may be of any usual or desired form as shown for example in the patent to Englesson 1,126,433, January 26, 1915. The compensating device 35 may be suitably pivotally connected to a lever 36 which may be fastened to a shaft 37 swingable in stationary pivots. Pivotally connected with lever 36 is a link 38 which is in turn pivoted to a relay lever 39. The relay lever 39 may be fastened to the shaft 13.

Here shown as adapted to operate in unison with lever 36, is a lever 40 to which is pivotally connected, a link or rod 41 in turn pivotally connected to a rod 42 adapted to reciprocate in bearings 43, 44. The rod 42 carries a cam device 45 adapted to be disposed in a slot or opening 46 formed in a portion 47 of the valve stem 24. The portion 47 need not, of course, be integral with the stem 24.

Figure 2:
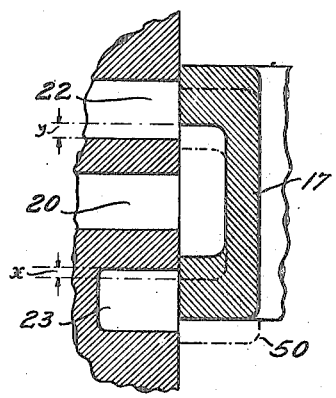
Fig. 2 is a fragmentary sectional view of a detail.
Figure 3:
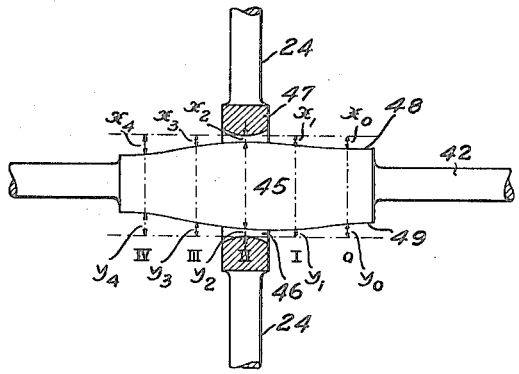
Fig. 3 is a fragmentary view of a detail, partly in section.

As shown in greater detail in Fig. 3, the cam device 45 is provided with two cam surfaces 48, 49 and these cam surfaces may be of any desired form and may also, if desired, differ from each other. It will be clear that in the position of the parts shown in Fig. 3 the motion of the valve stem 24 is limited in both the upward and downward directions, as viewed in the figure. In general, when the valve stem 24 is lifted the valve piston 17 (see Fig. 2) will be lifted an amount $y$ dependent upon the position of the cam 49. Fluid may thus be admitted from port 20 to port 22 through the opening $y$ as determined by the cam 49. The opening $y$ thus determines the rate of motion of the servo-motor and therefore of the needle 4 or other operating-fluid-admission-controlling means in the closing direction. In a similar manner if the valve stem 24 is dropped, an opening $x$ will be afforded between the ports 20 and 23 and the opening $x$ will in like manner determine the rate of motion of the admission-controlling means in the opening direction.

Referring again to Fig. 1 when the piston 8 is in the right hand dot and dash position the needle 4 is in the completely closed position and this position of the piston has been designated as O. Similarly, each one quarter of the travel of piston 8 toward the open position of the nozzle 3 has been designated successively as I, II, III, IV. When the piston 8 is in any one of these designated positions the cam device 45 will have a position with respect to the valve stem 24 as indicated by the vertical dot and dash lines in Fig. 3 bearing the legends O, I, II, III, IV. For example, in Fig. 1 the piston 8 is in the position II and the cam device 45 is disposed with respect to the valve stem 24 so that the dot and dash line II is alined with the valve stem.

The operation of the control system is as follows: Assuming the position of the parts to be as shown in Fig. 1, that is, that the wheel 1 is operating, the nozzle being in substantially the half open position and the governor being deadbeat, that is, the valve piston 17 covers both the ports 22, 23, no fluid under pressure is then admitted to either end of cylinder 7 and the needle 4 is stationary. If now a change in speed occurs, for example, a rise in speed, the fly balls 32 will lift the floating pivot 31 and the floating lever 30 will lift the valve stem 24, the force being transmitted through sleeve 25 and spring 27. The amount of such lift will be, in this particular position of the parts, not greater than an amount $y_2$ determined by the cam surface 49 in position II. The needle 4 will therefore move toward the closed position at a predetermined rate. The cam 45 is simultaneously moved toward the left, as viewed in the figures, by reason of the connections hereinbefore described. The compensating device 35 operates in an old and well known manner. As the needle continues to move toward the closed position from position II to position I, the lift of valve piston 17, in the instance illustrated, may be gradually decreased until when position I is reached the lift may be an amount $y_1$. If the fly balls 32 still exert a lifting action on the valve stem 24, which would occur for example, if the load had been entirely removed from the prime mover or the speed was still too high, the needle 4 would continue to move to the closed position and the valve lift would be gradually permitted to increase, the lift being $y_0$ in position O. It is of course evident that if desired the lift $y_0$ may be made quite small, in other words, the cam 49 might have a bulge in or near the position O if it were necessary or desirable to cause the needle 4 to move very slowly just as the last part of the flow was clipped off. If the prime mover had been assumed to be running at full load, that is, with the nozzle wide open and with the piston 8 in position IV, the cam 45 would have been in position IV and the valve lift would have been $y_4$, gradually decreasing as the needle was moved toward closed position, being $y_3$ in position III.

If it be assumed that the nozzle is entirely closed and the starting operation is initiated, the valve stem 24 will be dropped an amount $x_0$ inasmuch as the cam 45 is then in the O position. As the needle moves toward the open position the valve drop is limited to $x_1$, $x_2$, $x_3$, $x_4$ in positions I, II, III and IV respectively. The valve drops may be so selected that the rate of motion of the needle will be such at any point in its travel toward the open position that undesirable pressure decreases in the conduit 2 may be avoided.

By reason of the flexible connection between the floating lever 30 and the valve stem 24 it is not material how much movement due to a speed change is given by the fly balls 32 to the lever 30; the valve lift or valve drop can never be larger than is predetermined by the cam device 45 with the needle 4 in any given position. If curves were plotted with say the rate of motion of the needle 4 as ordinates and the position of the needle as abscissæ a characteristic curve would be obtained if we start with the needle in fully open position and cause it to move to the fully closed position. A different characteristic curve would be obtained if the needle were moved from an intermediate position to the closed position. The same is true if the needle is moved from the fully closed position to the fully open position or from an intermediate position to the fully open position. For the sake of brevity, characteristics of this kind have been termed in the claims "rate of motion-position" characteristics. It is evident that by proper selection of either or both of the cam surfaces 48, 49 any desired rate of motion-position characteristics may be obtained.

It should be understood that it is not desired that the invention be limited to the use of a cam for attaining the desired results but that other forms of means may be substituted for said cam and for other details of construction shown and described herein, such as may occur to persons skilled in the art.

It is claimed and desired to secure by Letters Patent:

1. In a prime mover control system, a fluid supply means for said prime mover, means for controlling the amount of fluid flowing from said supply means, means for operating said controlling means, and means whereby said operating means is caused to move said fluid controlling means at a rate dependent upon the position of said fluid controlling means.

2. In a prime mover control system, a fluid supply means for said prime mover, means for controlling the amount of fluid flowing from said supply means, means for operating said controlling means, means responsive to the speed of said prime mover for controlling said operating means, and means whereby said operating means is caused to move said fluid controlling means at a rate dependent upon the position of said fluid controlling means.

3. In a prime mover control system, a fluid supply means for said prime mover, means for controlling the amount of fluid flowing from said supply means, means for operating said controlling means, means adjustable to different positions to a predetermined limit for controlling said operating means to cause said operating means to move at a rate dependent upon the position of said adjustable means, and means dependent upon the position of said fluid controlling means for controlling said predetermined limit.

4. In a prime mover control system, a fluid supply means for said prime mover, means for controlling the amount of fluid flowing from said supply means, means for operating said controlling means, means adjustable to different positions to a predetermined limit for controlling said operating means to cause said operating means to move at a rate dependent upon the position of said adjustable means, means responsive to the speed of said prime mover for controlling said adjustable means, and means dependent upon the position of said fluid controlling means for controlling said predetermined limit.

5. In a prime mover control system, means for controlling the admission of operating fluid to said prime mover, a servo-motor for operating said admission controlling means, a regulating valve adjustable to different positions to a predetermined limit for controlling said servo-motor to cause said servo-motor to move at a rate dependent upon the position of said regulating valve, and means dependent upon the position of said admission controlling means for controlling said predetermined limit.

6. In a prime mover control system, means for controlling the admission of operating fluid to said prime mover, a servo-motor for operating said admission controlling means, a regulating valve adjustable to different positions to a predetermined limit for controlling said servo-motor to cause said servo-motor to move at a rate dependent upon the position of said regulating valve, means responsive to the speed of said prime mover for controlling the adjustment of said regulating valve, and means dependent upon the position of said admission controlling means for controlling said predetermined limit.

7. In a prime mover control system, means for controlling the admission of operating fluid to said prime mover, a servo-motor for operating said admission controlling means, a regulating valve adjustable to different positions to a predetermined limit for controlling said servo-motor to cause said servo-motor to move at a rate dependent upon the position of said regulating valve, and means including a cam operatively related to said regulating valve and dependent upon the position of said admission controlling means for controlling said predetermined limit.

8. In a prime mover control system, means for controlling the admission of operating fluid to said prime mover, a servo-motor for operating said admission controlling means, a regulating valve adjustable to different positions to a predetermined limit for controlling said servo-motor to cause said servo-motor to move at a rate dependent upon the position of said regulating valve, means responsive to the speed of said prime mover for controlling the adjustment of said regulating valve, and means including a cam operatively related to said regulating valve and dependent upon the position of said admission controlling means for controlling said predetermined limit.

9. In a prime mover control system, means for controlling the admission of operating fluid to said prime mover, means for operating said admission controlling means, and means whereby said operating means may be caused to move said admission controlling means from closed to open position with a predetermined rate of motion-position characteristic and from open to closed position with a different predetermined rate of motion-position characteristic.

10. In a prime mover control system, means for controlling the admission of operating fluid to said prime mover, means for operating said admission controlling means, means responsive to the speed of said prime mover for controlling said operating means, and means whereby said operating means may be caused to move said admission controlling means from closed to open position with a predetermined rate of motion-position characteristic and from open to closed position with a different predetermined rate of motion-position characteristic.

11. In a prime mover control system, means for controlling the admission of operating fluid to said prime mover, a servo-motor for operating said admission controlling means, a regulating valve adjustable to different positions to predetermined limits for controlling said servo-motor to cause said servo-motor to move at a rate dependent upon the position of said regulating valve, and means including a pair of cams of predetermined form operatively related to said regulating valve and dependent upon the position of said admission controlling means for controlling said predetermined limits, one of said cams controlling said adjustments in the closing direction and the other in the opening direction.

12. In a control system, a servo-motor, force transmitting means operable by said servo-motor, and means operatively related to said transmitting means for varying the amount of power furnished by said servo-motor dependent upon the position of said transmitting means.

In testimony whereof, the signature of the inventor is affixed hereto.

ARNOLD PFAU.